United States Patent Office.

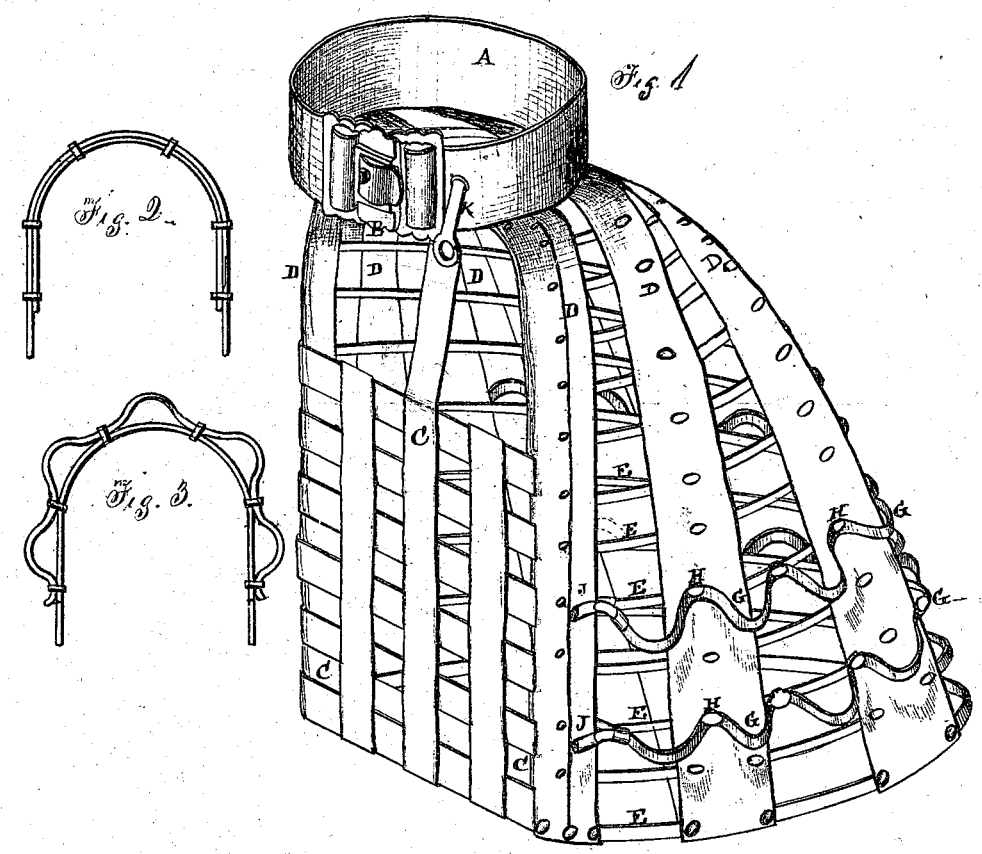

GOTTFRIED BIERING, OF NEW YORK, N. Y.

Letters Patent No. 97,750, dated December 7, 1869.

IMPROVEMENT IN HOOP-SKIRTS.

The Schedule referred to in these Letters Patent and making part of the same.

*To all whom it may concern:*

Be it known that I, GOTTFRIED BIERING, of the city of New York, and State of New York, have invented new and useful "Improvements in Hoop-Skirts," that I style the "Oriental Spring-Skirt;" and I do hereby declare the following to be an exact description thereof, reference being had to the accompanying drawings, and to the letters of reference marked thereon, making a part of this specification.

Figure 1 represents a perspective view of the hoop-skirt.

Figure 2 shows the hoops when parallel and straight with each other.

Figure 3 exhibits the outside or auxiliary hoop, adjusted in curves.

The nature of my invention consists in combining, with the ordinary hoops of a skirt, other additional ones outside of the same, which are adjustable, so as to contract or distend the dress or other outer garments resting upon the same, at pleasure, by means of slides connecting the said parts.

To enable others skilled in the art to make and use my invention, I will proceed to describe its construction and operation, as follows:

A represents the belt of the skirt, with its clasp B in front.

C, the tape or braided front of the skirt.

D D, the braids that support the hoops or wires E, and are attached to the belt above.

On the outside of two or more of the hoops or wires E E, I attach the additional wires G G, by links or rings H H, in which the wires G are adjusted, the links being fastened to the hoops E at equi-distances apart, and are guides for the wire G to slide in, back or forward, the wire G being bent in waves or loops, so as to project outward beyond the circumference of the skirt, and operates as a spring or elastic projection for the dress to hang upon in a graceful manner; and these waves are regulated smaller or larger, as may be desired, by moving the ends J back or forward, which allows the lady's dress to trail or be raised off the ground, suitable for the parlor or street.

The front ends of the wires or hoops G slide backward or forward between the two front tapes or braids D, so as to shorten or lengthen the wires G, and the ends J do not extend beyond the front tape D, which prevents the lady's foot from coming in contact with the wire.

The centre braid C is attached to the belt above by a hook, K, for the purpose of supporting the skirt evenly and regularly in front, and the foot is prevented from catching in the skirt.

I do not claim a second series of corrugated hoops, rigidly fixed to the ordinary ones, to form a bustle, which is of itself old; but

What I claim as my invention, and desire to secure by Letters Patent, is—

The combination, with the ordinary hoops E, of a skirt and additional auxiliary and adjustable hoop G, operating as a spring, forming loops, and sliding backward or forward in links H, as herein described and for the purposes set forth.

GOTTFRIED BIERING.

Witnesses:
J. FRANKLIN REIGART,
EDM. F. BROWN.